(12) United States Patent
Notermans

(10) Patent No.: US 9,600,106 B2
(45) Date of Patent: Mar. 21, 2017

(54) ELECTRONIC DISPLAY MODULE AND APPARATUS USING THE SAME

(71) Applicant: InnoLux Corporation, Miao-Li County (TW)

(72) Inventor: Jef Jozef Martha Johannes Notermans, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 76 days.

(21) Appl. No.: 14/568,586

(22) Filed: Dec. 12, 2014

(65) Prior Publication Data

US 2016/0170509 A1 Jun. 16, 2016

(51) Int. Cl.
| | | |
|---|---|---|
| *G06F 3/041* | (2006.01) | |
| *G06F 1/16* | (2006.01) | |
| *G04G 17/04* | (2006.01) | |
| *G04G 17/06* | (2006.01) | |
| *G04G 21/08* | (2010.01) | |

(52) U.S. Cl.
CPC .......... *G06F 3/041* (2013.01); *G04G 17/04* (2013.01); *G04G 17/06* (2013.01); *G04G 21/08* (2013.01); *G06F 1/163* (2013.01)

(58) Field of Classification Search
CPC .......... H01L 23/13; G09G 2300/0426; G09G 2300/0408; G09G 2310/0232; G09G 2310/0278; G09G 2310/0281; G09G 3/3685; G06F 3/044; G06F 2203/04103; G06F 3/03547; G06F 3/041; G06F 3/0416
See application file for complete search history.

(56) References Cited

U.S. PATENT DOCUMENTS

| | | | | |
|---|---|---|---|---|
| 6,527,711 | B1 * | 3/2003 | Stivoric | A61B 5/0002 128/898 |
| 8,860,669 | B2 * | 10/2014 | Kim | G06F 3/044 178/18.01 |
| 2004/0252451 | A1 * | 12/2004 | Wilson | G06F 1/18 361/679.21 |
| 2008/0171182 | A1 * | 7/2008 | Kawate | H05K 3/323 428/209 |
| 2010/0045590 | A1 * | 2/2010 | Kumamoto | G02F 1/13452 345/102 |
| 2011/0001706 | A1 * | 1/2011 | Sanford | G06F 3/0412 345/173 |
| 2012/0195008 | A1 * | 8/2012 | McClure | G06F 1/1613 361/749 |

(Continued)

FOREIGN PATENT DOCUMENTS

CN 201110838 Y * 9/2008 ............. G01N 27/18

*Primary Examiner* — Andrew Sasinowski
*Assistant Examiner* — Gerald Oliver
(74) *Attorney, Agent, or Firm* — McClure, Qualey & Rodack, LLP

(57) ABSTRACT

An electronic display module is provided. The electronic display module includes a touch display assembly, a first circuit board, and a second circuit board. The touch display assembly has a bottom edge and a top edge located at two sides of the touch display assembly. The first circuit board is connected to the bottom edge of the touch display assembly. The second circuit board is connected to the top edge of the touch display assembly. A distance from the active area to the bottom edge is different from a distance from the active area to the top edge.

18 Claims, 12 Drawing Sheets

(56) References Cited

U.S. PATENT DOCUMENTS

| | | | |
|---|---|---|---|
| 2013/0106807 A1* | 5/2013 | Lin | H04N 13/0404 345/204 |
| 2013/0241076 A1* | 9/2013 | Mandlik | H01L 51/5253 257/774 |
| 2014/0063719 A1* | 3/2014 | Yamazaki | G06F 1/1601 361/679.21 |
| 2015/0091858 A1* | 4/2015 | Rosenberg | G06F 3/0414 345/174 |
| 2015/0130763 A1* | 5/2015 | Park | G06F 3/041 345/174 |
| 2015/0162388 A1* | 6/2015 | Kim | H01L 27/323 257/40 |
| 2015/0262554 A1* | 9/2015 | Park | G09G 5/18 345/212 |
| 2016/0098143 A1* | 4/2016 | Kida | G06F 3/041 345/174 |

* cited by examiner

ELECTRONIC DISPLAY MODULE AND APPARATUS USING THE SAME

BACKGROUND

Field of the Invention

The present invention relates to an electronic device and an element thereof, and more particularly to an electronic display module and a display panel thereof.

Description of the Related Art

An electronic display module is an optoelectronic device able to transfer electric signals into visible images so that human beings can see the information contained in the electronic signals. Demand for electronic display modules with touch-sensing functionality has risen in recent years. Specifically, electronic devices such as mobile phones, PDAs and tablet computers that integrate touch-sensing functionality into the electronic display module have become increasingly popular due to ease of operation, and these devices can be referred to as "touch display panels". Several types of touch display panels have been developed, for example the out-cell type touch display panel, in-cell type touch display panel, and on-cell type touch display panel.

The user can perform various functions on the touch display panel by touching an active area thereof using a finger, a stylus, or another object. Generally, the active area is surrounded by a non-transparent peripheral region which is not touch-sensitive. Since the size of the peripheral region limits the active area available for the user, for a given size of the apparatus using the touch display panel, it is desirable to minimize the peripheral region so as to increase the ratio of the active area.

BRIEF SUMMARY OF THE DISCLOSURE

One objective is to prove an electronic display module and an electronic apparatus with an innovative structure.

According to some embodiments of the disclosure, the electronic display module includes a touch display assembly, a first circuit board, and a second circuit board. The touch display assembly includes a main substrate and a cover substrate. The main substrate has an active area and a first extending area extending outward in a first direction. The cover substrate has a second extending area extending outward in a second direction. The first circuit board is connected to the first extending area. The second circuit board is connected to the second extending area. The projection distance from edge of the active area to edge of the first extending area through the first direction is greater than the projection distance from edge of the active area to edge of the second extending area through the second direction.

In some embodiments, the touch display assembly comprises a plurality of transistors, a sealing material, and a liquid-crystal layer. The transistors are formed on the active area of the main substrate. The sealing material is disposed between the main substrate and the cover substrate. The liquid-crystal layer is disposed between the main substrate and the cover substrate and adjacent to the sealing material.

In some embodiments, the first extending area is exposed by the cover substrate.

In some embodiments, the length of the first circuit board is greater than the length of the second circuit board.

In some embodiments, the first direction is opposite to the second direction.

In some embodiments, the electronic display module further comprises a protection substrate and a touch sensing unit. The cover substrate is disposed between the main substrate and the protection substrate. The touch sensing unit is disposed between the cover substrate and the protection substrate.

In some embodiments, the electronic display module further comprises a first driving chip disposed on the main substrate and a second driving chip disposed on the second circuit board.

In some embodiments, the touch display assembly comprises a plurality of transistors, a sealing material, and an OLED layer. The transistors are formed on the active area of the main substrate. The sealing material is disposed between the main substrate and the cover substrate. The OLED layer is disposed between the main substrate and the cover substrate and adjacent to the sealing material.

In some embodiments, the electronic display module further comprises a backlight assembly and a third circuit board. The backlight assembly is arranged adjacent to the touch display assembly and configured to provide backlight for the touch display assembly. The third circuit board is electrically connected to the backlight assembly. The first circuit board overlaps the third circuit board, and the first circuit board has a through hole that partially exposes the third circuit board. A conductive material is positioned in the through hole and electrically connects the third circuit board to the first circuit board.

In some embodiments, the electronic display module further comprises a backlight assembly and a third circuit board. The backlight assembly is arranged adjacent to the touch display assembly and configured to provide backlight for the touch display assembly. The third circuit board is electrically connected to the backlight assembly. The third circuit board comprises a first portion overlapped by the first circuit board and a second portion overlapping the first circuit board. The third circuit board is electrically connected to the first circuit board by the second portion.

According to some embodiments of the disclosure, an electronic apparatus includes a housing with round shape and touch display assembly of any of the above-mentioned embodiments. The bottom edge is spaced from the substantial center of the touch display assembly by a first distance, and the top edge is spaced from the substantial center of the touch display assembly by a second distance, and the first distance is greater than the second distance but smaller than the radius of the housing. In addition, the bottom edge and the top edge are straight lines that are parallel to each other.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

Figure 1:
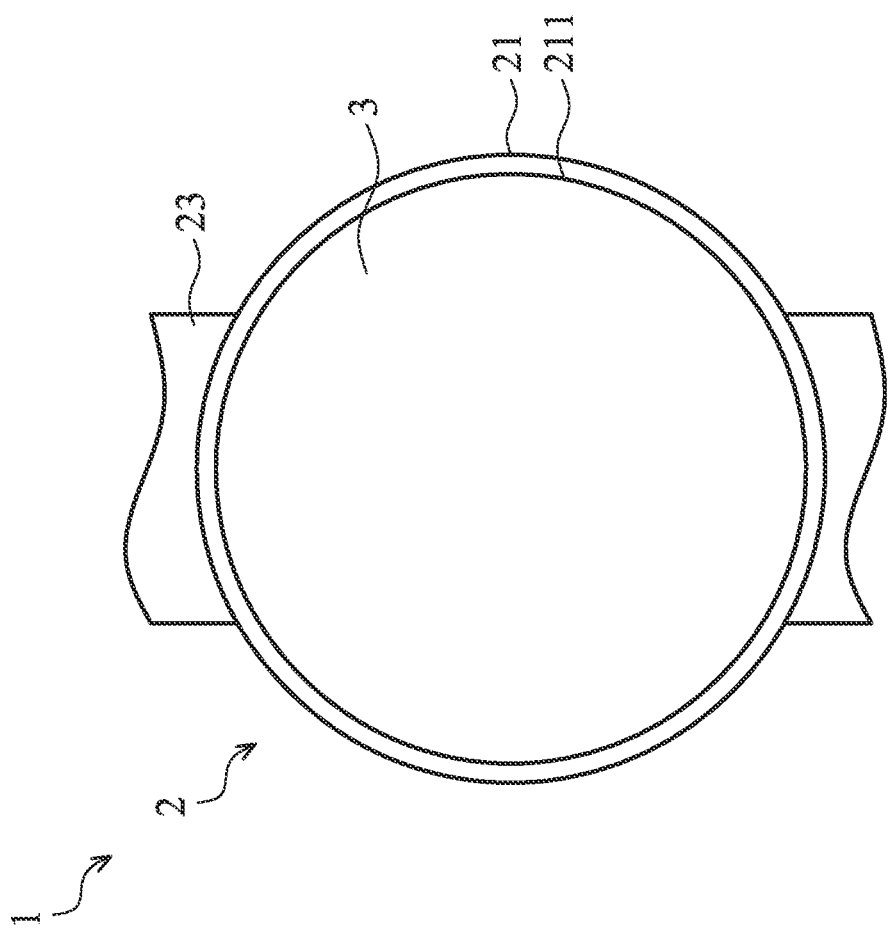
FIG. 1 shows a schematic view of an electronic apparatus, in accordance with some embodiments of the disclosure.

The electronic display module and the electronic apparatus of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first insulating bump disposed on/over a second material layer", may indicate not only the direct contact of the first insulating bump and the second material layer, but also, a non-contact state with one or more intermediate layers between the first insulating bump and the second material layer. In the above situation, the first insulating bump may not directly contact the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Referring to FIG. 1, according to some embodiments, the electronic apparatus 1 is a wearable apparatus, for example a watch with touch-sensing functionality. The electronic apparatus 1 includes a housing 2 and an electronic display module 3. The housing 2 includes a housing 21 and a fixing element 23 through which a wearer can fix the electronic apparatus 1 on a suitable position of on the body. The housing 21 defines an accommodating space with an opening 211 formed on the top surface of the housing 21, and the opening 211 has an edge with a rounded shape. The electronic display module 3 is disposed on the housing 21 relative to the opening 211.

Figure 2:
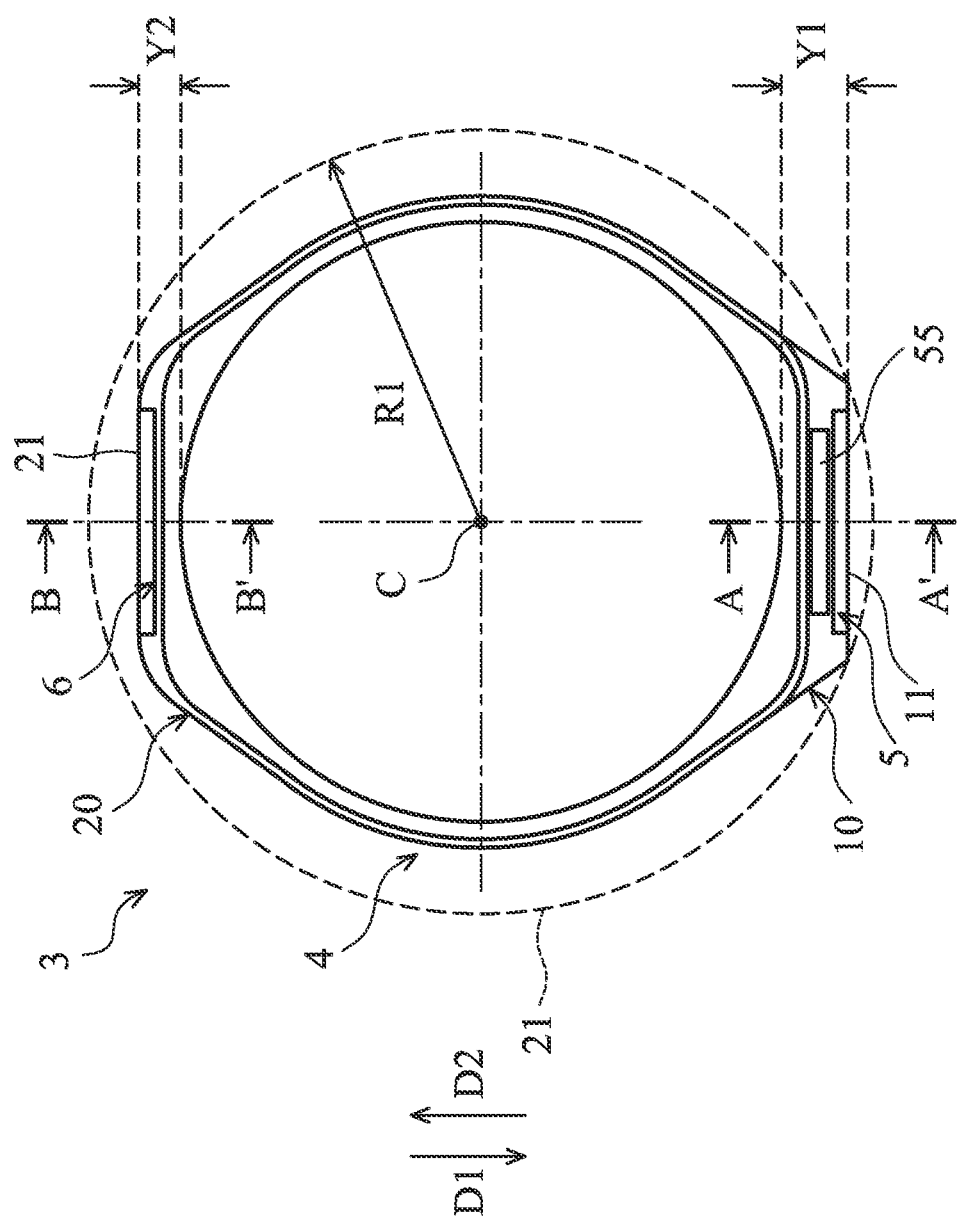
FIG. 2 shows a schematic view of an electronic display module positioned in a housing, in accordance with some embodiments of the disclosure.
Figure 3:
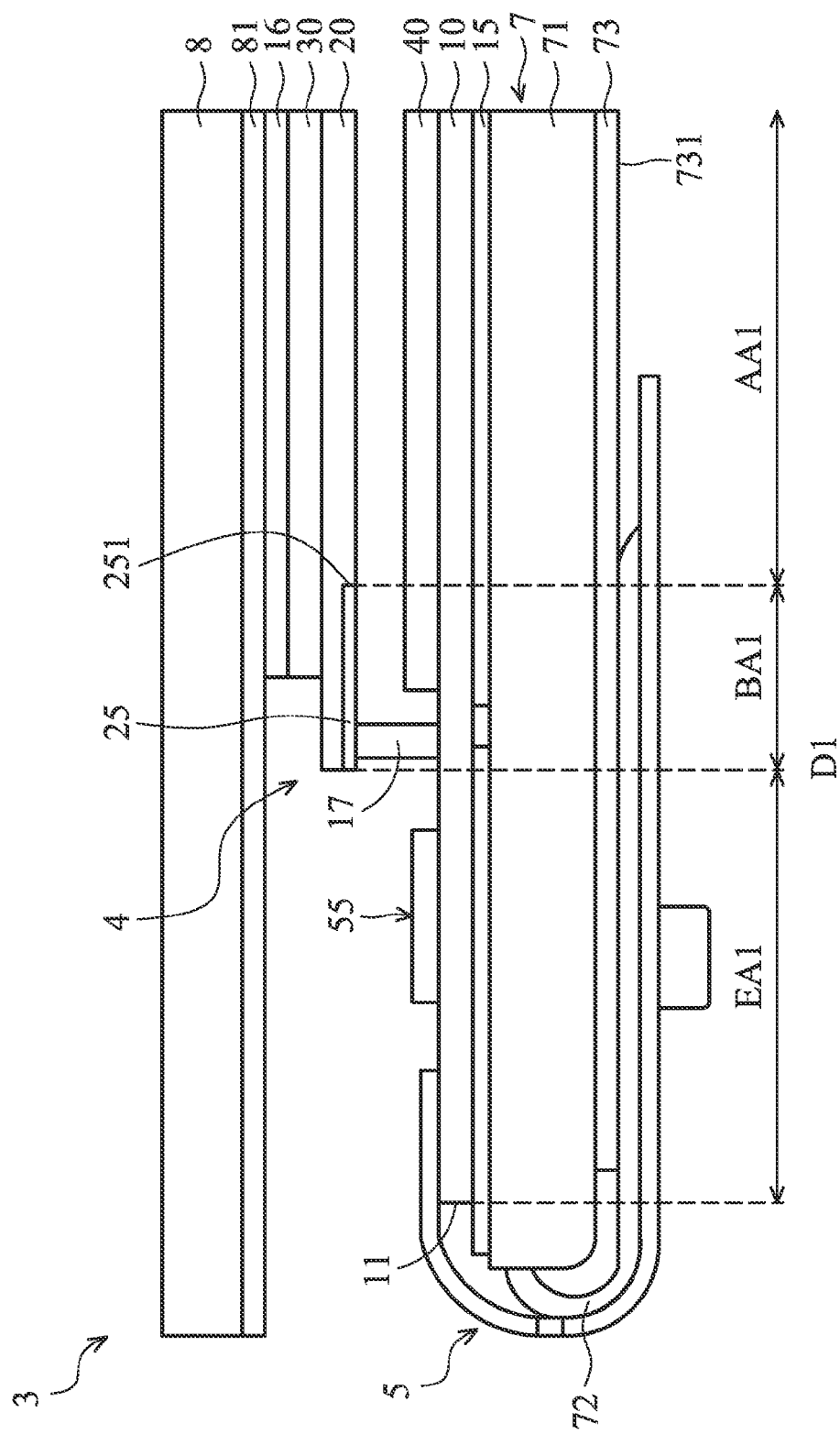
FIG. 3 shows a cross-sectional view taken along line A-A' of FIG. 2.
Figure 4:
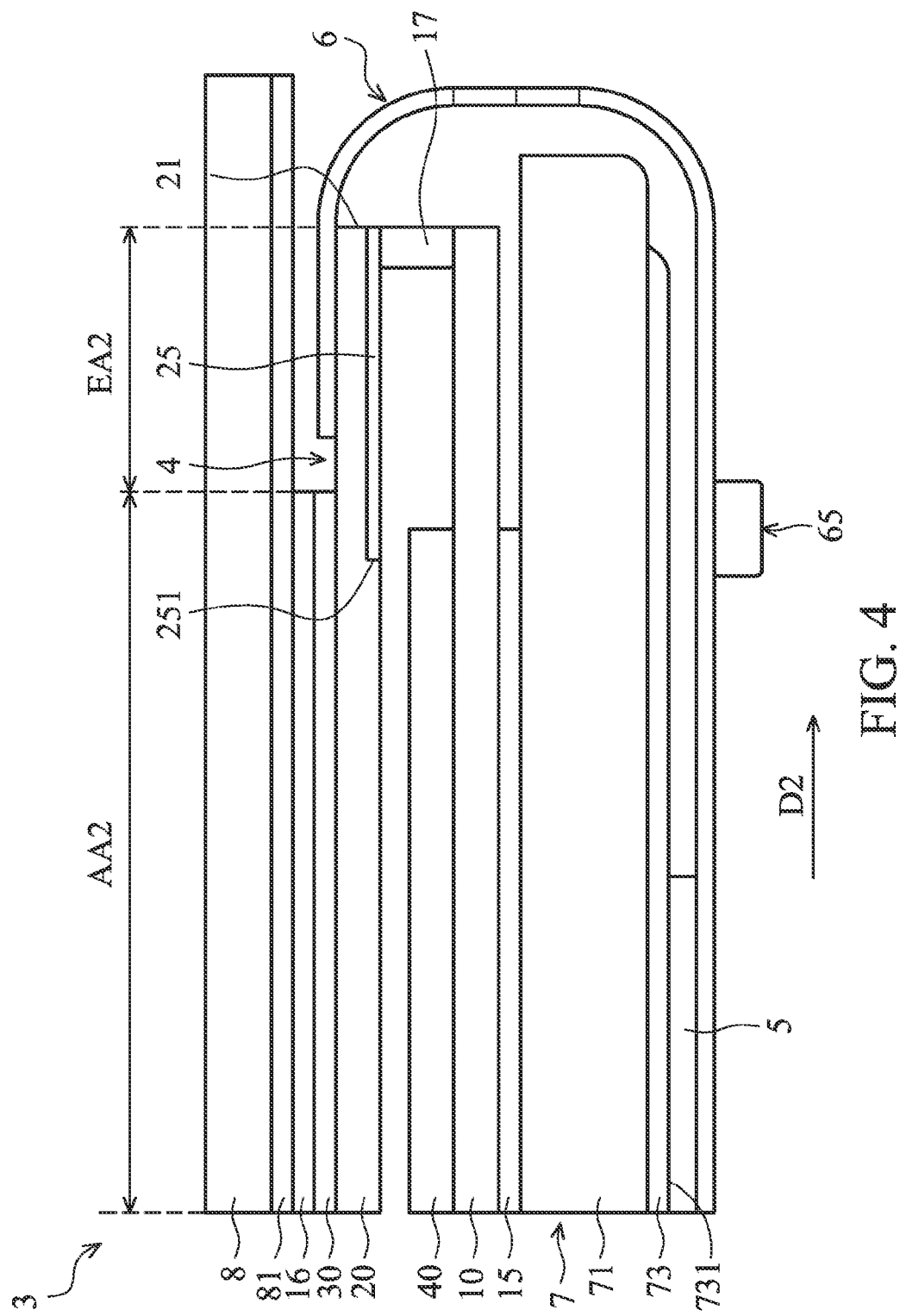
FIG. 4 shows a cross-sectional view taken along line B-B' of FIG. 2.

Referring to FIGS. 2-4, FIG. 2 shows a schematic view of the electronic display module 3, FIG. 3 shows a cross-sectional view taken along line A-A' of FIG. 2, and FIG. 4 shows a cross-sectional view taken along line B-B' of FIG. 2. In some embodiments, the electronic display module 3 includes a touch display assembly 4, a first circuit board 5, a second circuit board 6, a first driving chip 55, a second driving chip 65 (FIG. 4), a backlight module 7 (FIG. 3), and a protection substrate 8 (FIG. 3). The element of the electronic display module 3 can be added or omitted, and the invention should not be limited by the embodiment.

In some embodiments, the touch display assembly 4 is a liquid crystal display with touch-sensing functionality and includes a main substrate 10, a rear polarizer 15, a front polarizer 16, a cover substrate 20, a touch sensing layer 30, and an optical element layer 40 (FIG. 3). In some embodiments, the touch display assembly 4 is an organic light emitting diode display (OLED) with a main substrate 10, a front polarizer, a touch sensing layer 30, and an optical element layer 40 like organic light emitting diode device array.

As shown in FIG. 3, the main substrate 10 and the cover substrate 20 are spaced from each other by a sealing material 17. The main substrate 10 comprises a plurality of thin film transistor (TFT), pixel, and driving circuit. In the embodiment, the cover substrate 20 is a color filter substrate comprises a plurality of color filter, black matrix, and electrode. The cover substrate 20 for an OLED is a cover substrate comprises a plurality of electrode pattern for display or touch. The optical element layer 40, for example a liquid crystal layer, is disposed between the main substrate 10 and the cover substrate 20. The sealing material 17 disposed between the main substrate 10 and the cover substrate 20, and positioned around the optical element layer 40. In the embodiments shown in FIG. 3, partial area of the main substrate 10 is covered by the cover substrate 20, and the remaining area of the main substrate 10 is not covered by the cover substrate 20. For example, the main substrate 10 has an active area AA1, a peripheral area BA1, and an extending area EA1. The cover substrate 20 covers the main substrate 10 relative to the active area AA1 and the peripheral area BA1 and expose the extending area EA1. The active area AA1 comprises a plurality of TFT, pixel, and circuit. The peripheral area BA1 and the extending area EA1 comprise a plurality of driving circuit for connecting the TFTs, pixels and circuit of the active area AA1.

In some embodiments, the active area AA1 of the main substrate 10 is defined by an inner edge 251 of a light-blocking element 25 formed on the outermost of the cover substrate 20. The light-blocking element 25 may be formed on the inner surface of the cover substrate 20 that faces the main substrate 10. Alternatively, the light-blocking element 25 may be formed on the outer surface of the cover substrate 20 that faces away from the main substrate 10. The active area AA1 may have a round shape with a center C (FIG. 2), however the disclosure should not be limited thereto.

The peripheral area BA1 is located between the active area AA1 and the extending area EA1. A fan-out wiring of a driving circuit is formed on the peripheral area BA1. The extending area EA1 extends outward in a first direction D1 from the extending area EA1 and terminates at a first outer edge 11. Since the first outer edge 11 is the outermost edge of the touch display assembly 3 in the first direction D1, in the following description, the first outer edge 11 is referred to as the bottom edge of the touch display assembly 3, for the purpose of the description.

Figure 5:
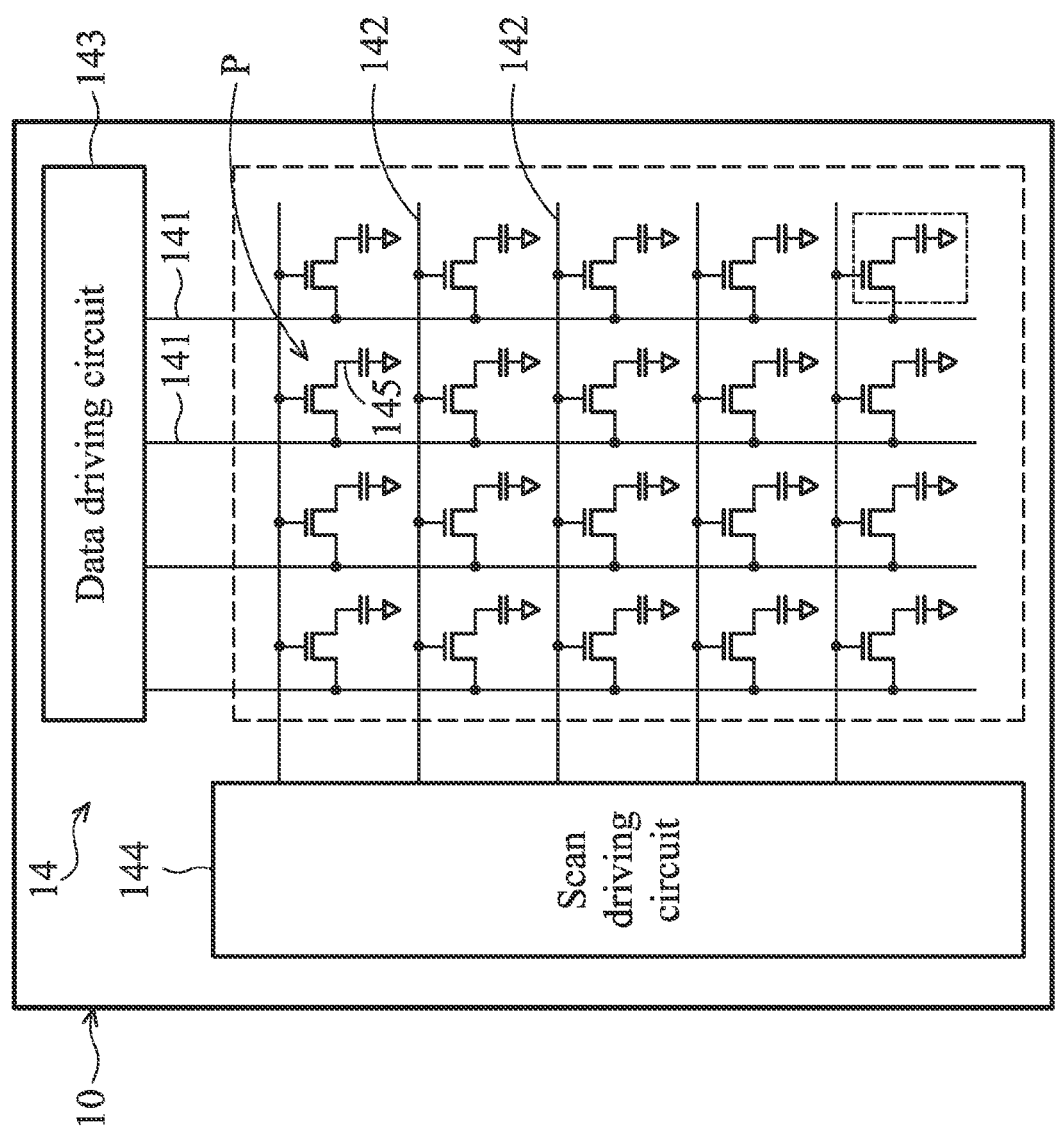
FIG. 5 shows a schematic view of a circuit unit of a first substrate, in accordance with some embodiments of the disclosure.

In some embodiments, the main substrate 10 is a TFT glass substrate and includes a number of semiconductor transistors configured to control the light of each pixel of the touch display assembly 3. For example, as shown in FIG. 5, a circuit unit 14 is formed on the main substrate 10 and includes a number of data lines 141 and a number of gate lines 142. The data lines 141 are electrically connected to the data driving circuit 143 and extend parallel to each other. The gate lines 142 are electrically connected to the scan driving circuit 144 and extend parallel to each other. The gate lines 142 intersect the data lines 141, and the area constituted by two adjacent gate lines 142 and two adjacent data lines 141 is defined as a pixel area P. A number of semiconductor transistors 145 are formed in pixel areas P. The semiconductor transistors 145 are connected to a pixel electrode (not shown in the figures) configured to control the optical element layer 40.

Referring again to FIG. 3, the touch sensing layer 30 provided with touch-sensing functionality is positioned between the front polarizer 16 and the cover substrate 20. In some embodiments, the touch sensing layer 30 includes a sensing array which includes a number of transmitting electrodes (not shown in figures) and a number of receiving electrodes (not shown in figures). By detecting the change of the electric field between the horizontal sensing electrodes and the vertical sensing electrodes, a touch position is determined.

As shown in FIG. 4, the cover substrate 20 has an active area AA2 and an extending are EA2. In some embodiments, the active area AA2 is an area of the cover substrate 20 that is covered by the front polarizer 16 and by the extending area EA2 extending in a second direction D2 from the active area AA2 and terminates at a top edge 21. The second direction D2 is different from the first direction D1 (FIG. 2) along which the extending area AA1 of the main substrate 10 extends. Since the second outer edge 21 is the outermost edge of the touch display assembly 3 in the direction D2, in the following description, the second outer edge 21 is referred to as the top edge of the touch display assembly 3, for the purpose of the description.

In some embodiments, as shown in FIG. 2, the second direction D2 is opposite to the first direction D1, the bottom edge 11 and the top edge 21 of the touch display assembly 3 are straight lines and parallel to each other, however the disclosure should not be limited thereto. In some embodiments, the bottom edge 11 and the top edge 21 are located at two different sides of a substantial center C of the touch display assembly 3. In some embodiments, the bottom edge 11 and the top edge 21 are located at two opposite sides of a substantial center C of the touch display assembly 3. The substantial center C is a center of the active area AA1. In some embodiments, a first distance Y1, from the bottom edge 11 to the active area AA1 of the main substrate 10, is different from a second distance Y2, from the projection of the top edge 21 to the active area AA1 of the main substrate 10. first distance Y1 is larger than second distance Y2.

Referring to FIG. 3, in some embodiments, the backlight module 7 is positioned adjacent to the touch display assembly 4. The backlight module 7 includes a backlight assembly 71, a third circuit board 72, and a rear bezel 73. The backlight assembly 71 is positioned in the rear bezel 7 for providing backlight for the touch display assembly 4. The third circuit board 72 is connected to the backlight assembly 71. The third circuit board 72 may be a flexible printed circuit. A portion of the third circuit board 72 is positioned at the rear surface 731 of the rear bezel 73. In some embodiments, the protection substrate 8 is positioned on the front polarizer 16 by optical clear adhesive (OCA) 81 to protect the touch display assembly 4 from being damaged.

In some embodiments, as shown in FIG. 3, the first circuit board 5 is connected to the bottom edge 11 of the touch display assembly 3 and electrically connected to the semiconductor transistors 145 (FIG. 5) via wiring arranged on the main substrate 10. The first circuit board 5 may be a flexible printed circuit. A portion of the first circuit board 5 is positioned at a front of the touch display assembly 4, and the remaining portion of the first circuit board 5 is positioned at a rear of touch display assembly 4 and connected to the rear surface 731 of the rear bezel 73. The first driving chip 55 is positioned on the extending area EA1 of the main substrate 10 by a chip-on-glass (COG) technique and electrically connected to the first circuit board 5.

In some embodiments, as shown in FIG. 4, the second circuit board 6 is connected to the top edge 21 of the touch display assembly 3 and electrically connected to the touch sensing layer 30 via wiring arranged on the cover substrate 20. The second circuit board 6 may be a flexible printed circuit. A portion of the second circuit board 6 is positioned at the front of the touch display assembly 4, and the remaining portion of the second circuit board 6 is positioned at the rear of touch display assembly 4 and connected to the rear surface 731 of the rear bezel 73. The second driving chip 65 is connected to the portion of second circuit board 6 which is positioned at the rear of the touch display assembly 3 via a chip on flexible printed circuit (COF) technique.

Figure 6:
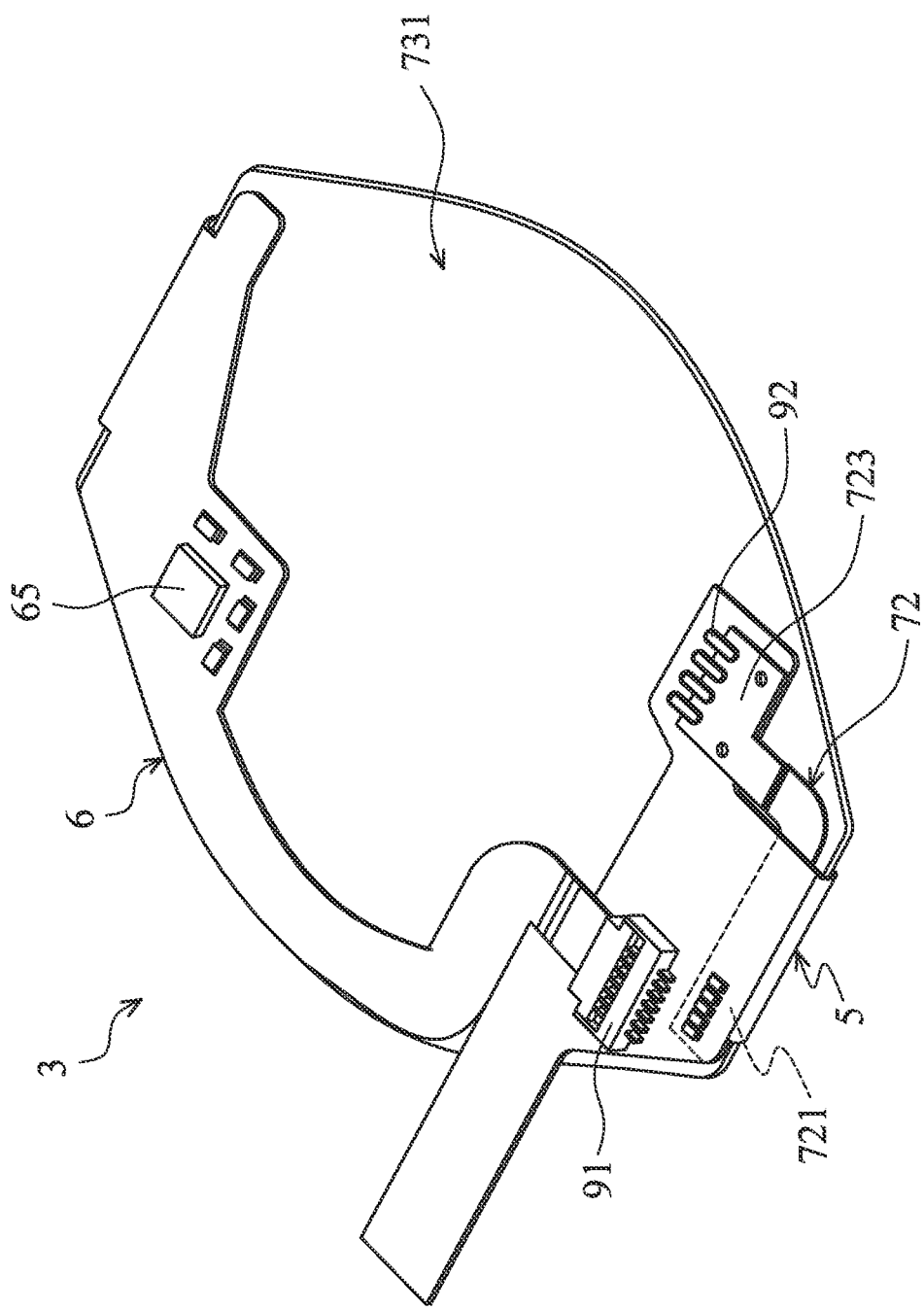
FIG. 6 shows a schematic back view of an electronic display module, in accordance with some embodiments of the disclosure.

In some embodiments, the second circuit board 6 and the third circuit board 72 are electrically connected to the first circuit board 5 and receive electrical signals via the first circuit board 5. The second circuit board 6 is longer than the first circuit board 5. In some embodiments, as shown in FIG. 6, the electronic display module 3 further includes a connector 91 electrically connected to the portion of the first circuit board 5 which is positioned at the rear of the touch display assembly 3. The second circuit board 6 is electrically connected to the first circuit board 5 via the connector 91. In some embodiments, as shown in FIG. 6, the third circuit board 72 includes a first portion 721 overlapped by the first circuit board 5, and a second portion 723 which overlaps the first circuit board 5. The second portion 723 of the third circuit board 72 is electrically connected to the first circuit board 5 via a suitable conductive material 92, such as a welding material, however the disclosure should not be limited to the embodiments.

Figure 7:
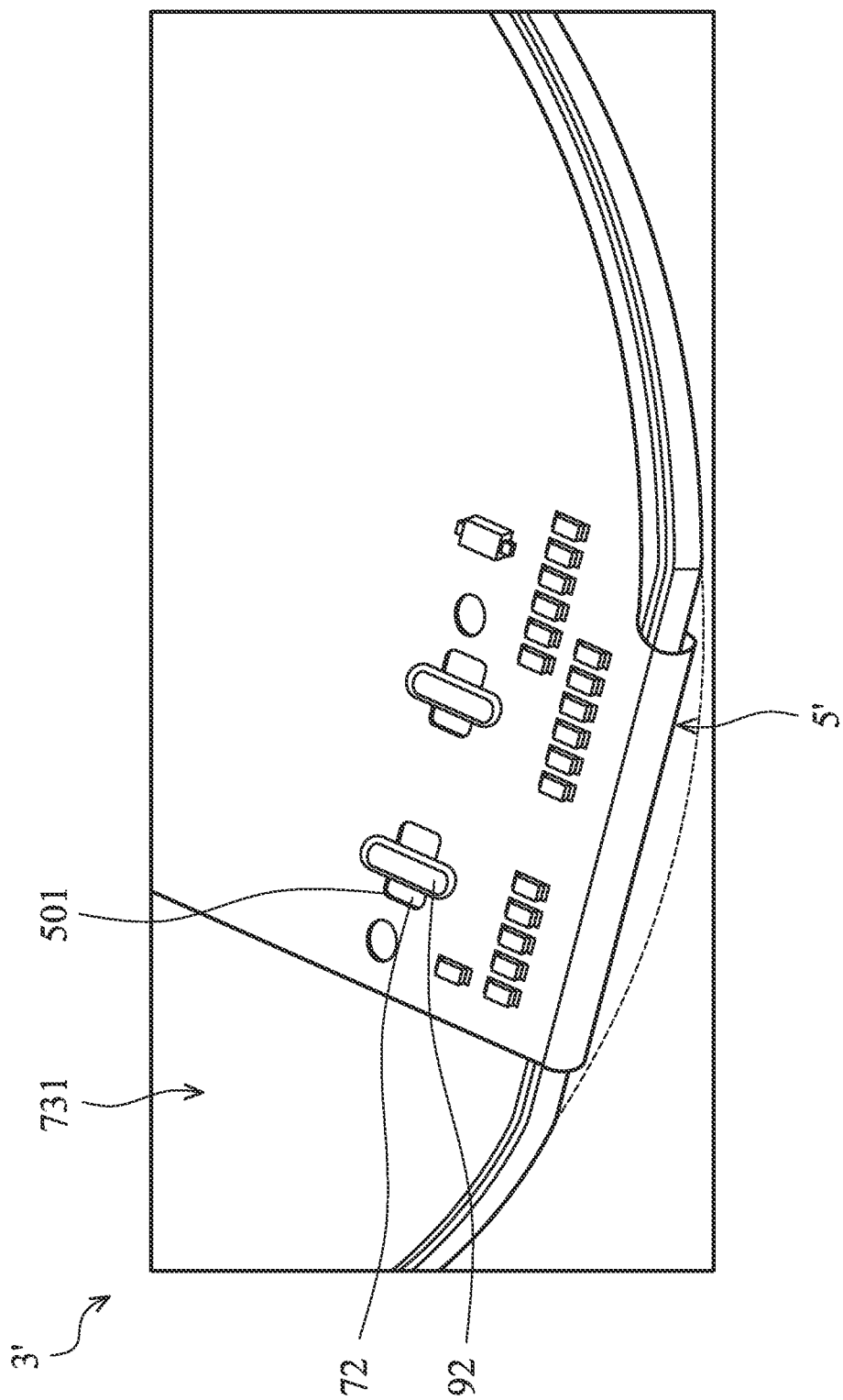
FIG. 7 shows a schematic view of an electronic display module, in accordance with some embodiments of the disclosure.

FIG. 7 shows a schematic view of an electronic display module 3', in accordance with some embodiments of the disclosure. In FIG. 7, elements similar to those of the electronic display module 3 are provided with the same reference numbers, and the features thereof are not repeated in the interest of brevity. Differences between the electronic display module 3' and the electronic display module 3 include a first circuit board 5' replacing the first circuit board 5.

In some embodiments, the portion of the first circuit board 5' which is connected to the rear surface 731 of the rear bezel 73 has one or more through holes 501. The first circuit board 5' overlaps the third circuit board 72 and is electrically connected to the third circuit board 72 via a suitable conductive material, such as a soldering material, positioned in the through holes 501.

In the above-mentioned embodiments, since the electronic display module 3 has a circular active area that is configured for displaying images, the electronic display module 3 has high compatibility with the housing 2 with the round-shaped opening 211 (FIG. 1). In addition, in the above-mentioned embodiments, the first circuit board 5 and the second circuit board 6 are respectively connected to the bottom edge 11 and the top edge 10, located at two sides of the touch display assembly 4. Therefore, the width of the peripheral region (i.e. the distances Y1 and Y2 shown in FIG. 2) between the active area and the outermost edge of the electronic display module 3 is decreased, as compared with the other display module having two circuit boards at the same edge. As a result, the ratio of the active area of an end product is increased, for a given size of the end product using the electronic display module 3.

The electronic display module of the disclosure should not be limited to the above-mentioned embodiments. The touch sensing layer provided with touch-sensing functionality may be formed in an add-on type touch panel or in an integrated type touch panel. In the description below, some exemplary possible implementation methods of the electronic display module will be illustrated.

Figure 8:
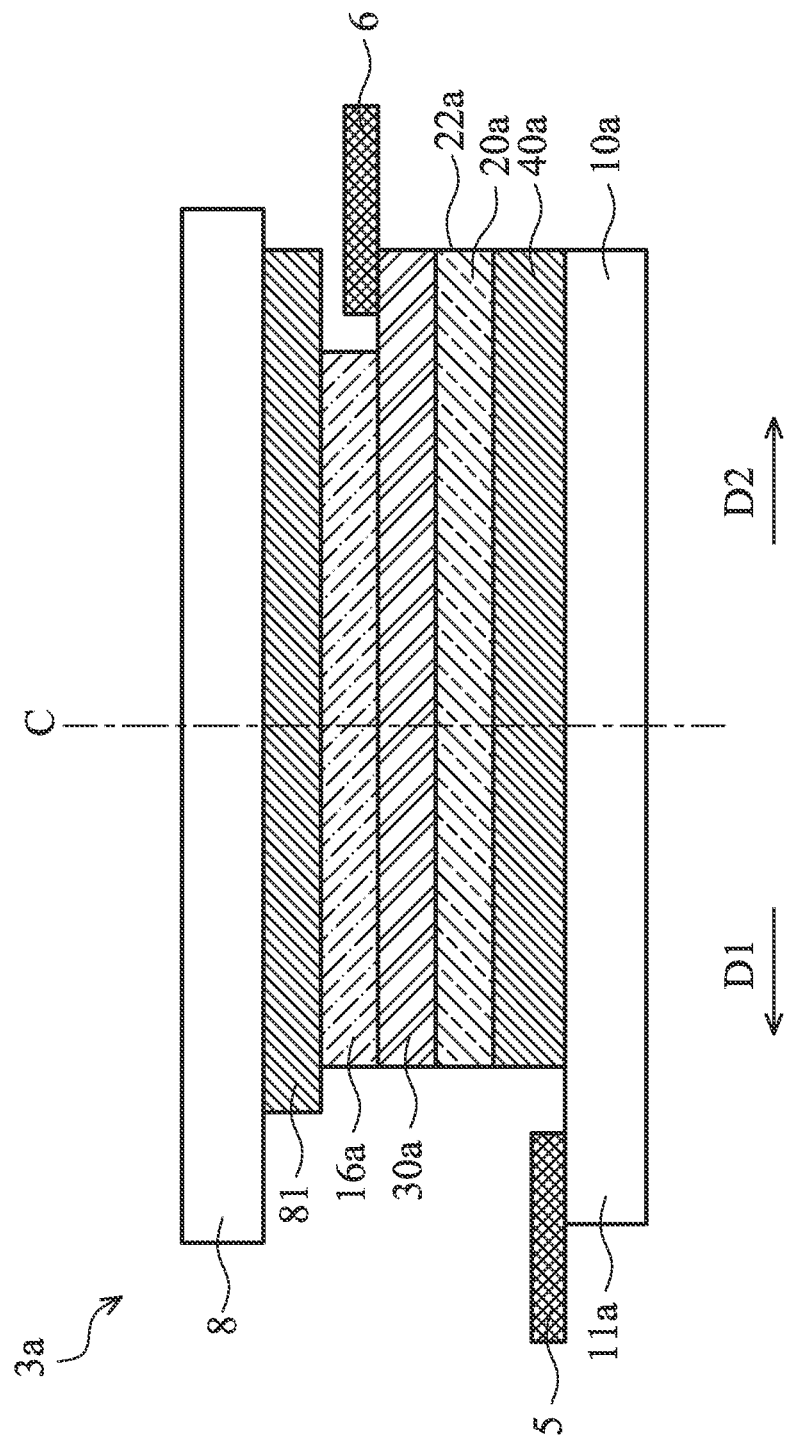
FIG. 8 shows a schematic view of an electronic display module, in accordance with some embodiments of the disclosure.

Referring to FIG. 8, an electronic display module 3a with on-cell type liquid-crystal panel includes a main substrate 10a, a front polarizer 16a, a cover substrate 20a, a touch sensing layer 30a, an optical element layer 40a, the first circuit board 5, the second circuit board 6, and the protection substrate 8, in accordance with some embodiments.

In some embodiments, the cover substrate 20a covers a portion of the main substrate 10a. The optical element layer 40a is positioned between the main substrate 10a and the cover substrate 20a. The touch sensing layer 30a is formed integrally onto the cover substrate 20a in a photo lithography process. The front polarizer 16a is disposed over the touch sensing layer 30a. The first circuit board 5 is positioned on a bottom edge 11a of the main substrate 10a. The second circuit board 6 is positioned on a top edge 22a of the cover substrate 20a. In some embodiments, the top edge is in portion of the protection substrate 8 that extends outward in a second direction D2 opposite to the first direction D1. The top edge 22a and the bottom edge 11a are located at two opposite side of a central line C that passes through the center of the active area of the main substrate 10a.

Figure 9:
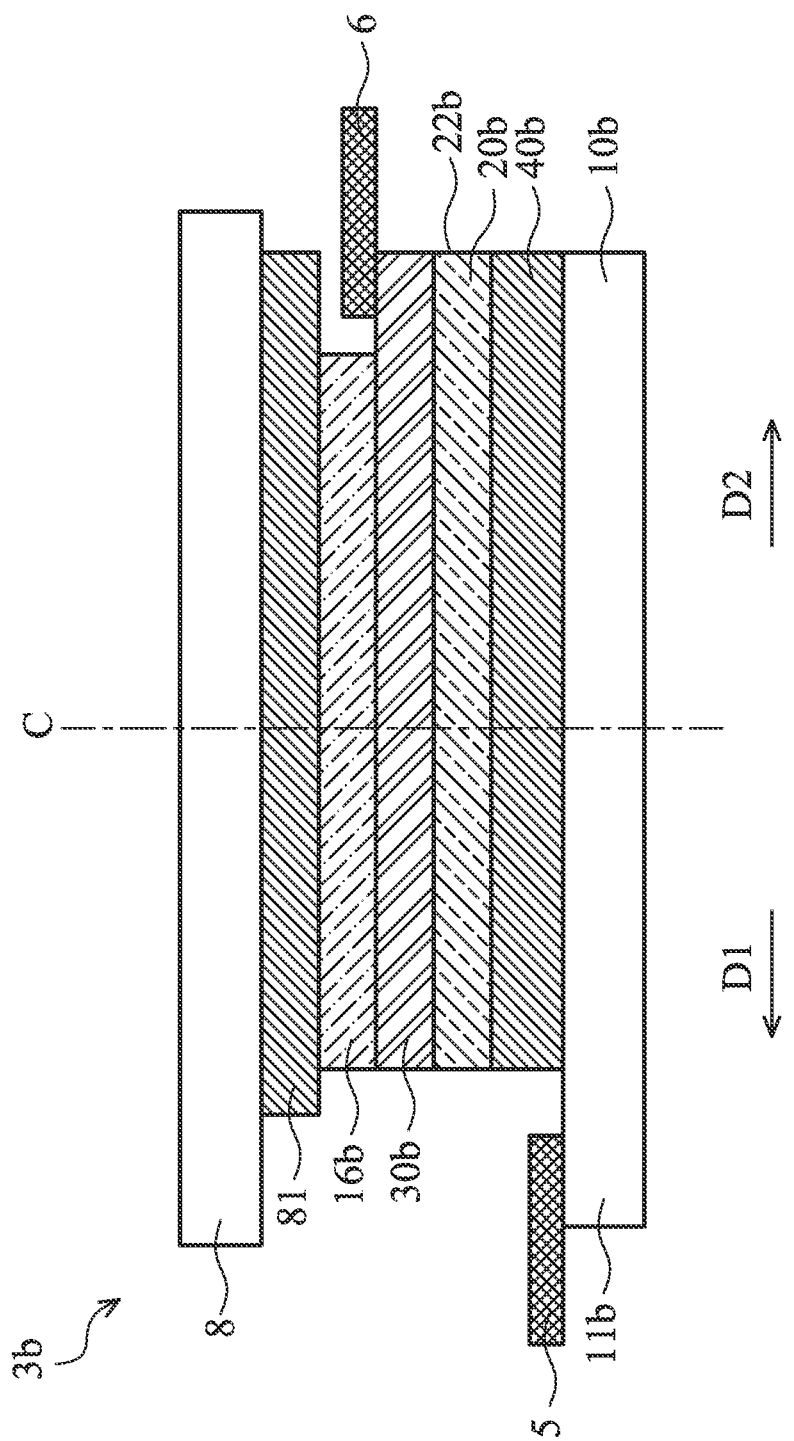
FIG. 9 shows a schematic view of an electronic display module, in accordance with some embodiments of the disclosure.

Referring to FIG. 9, an electronic display module 3b with an on-cell type OLED panel includes a main substrate 10b, a front polarizer 16b, an encapsulation substrate 20b, a touch sensing layer 30b, an optical element layer 40b, the first circuit board 5, the second circuit board 6, and the protection substrate 8, in accordance with some embodiments.

In some embodiments, the encapsulation substrate 20b, e.g. a glass substrate, covers a portion of the main substrate 10b. The optical element layer 40b, e.g. an OLED layer, is positioned between the main substrate 10b and the encapsulation substrate 20b. The touch sensing layer 30b is formed integrally onto the cover substrate 20a in a photo lithography process. The front polarizer 16b is disposed over the touch sensing layer 30b. The first circuit board 5 is positioned on a bottom edge 11 of the main substrate 10b. The second circuit board 6 is positioned (bonding) on a top edge 22b of the protection substrate 8.

Figure 10:
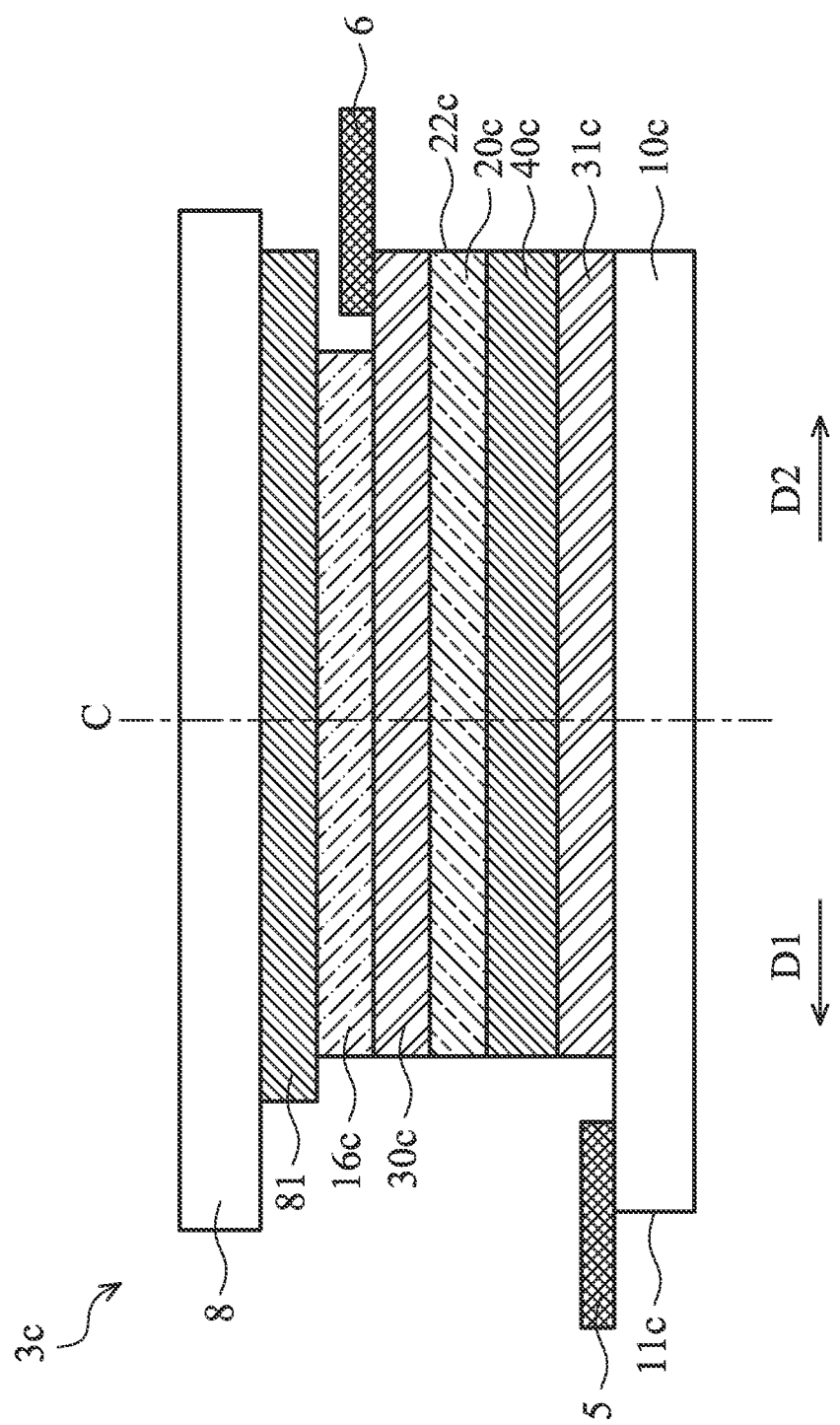
FIG. 10 shows a schematic view of an electronic display module, in accordance with some embodiments of the disclosure.

Referring to FIG. 10, an electronic display module 3c with an Hybrid in-cell type liquid crystal panel includes a main substrate 10c, a front polarizer 16c, a cover substrate 20c, a first touch sensing layer 31c, a second touch sensing layer 30c, an optical element layer 40c, the first circuit board 5, the second circuit board 6, and the protection substrate 8, in accordance with some embodiments.

In some embodiments, the cover substrate 20c covers a portion of the main substrate 10c. The optical element layer 40c is positioned between the main substrate 10c and the cover substrate 20c. The first touch sensing layer 31c is positioned between the main substrate 10c and the optical element layer 40c. The second touch sensing layer 30c is formed integrally onto the cover substrate 20c in a photo lithography process. The front polarizer 16c is disposed over the second touch sensing layer 30c. The first circuit board 5 is positioned on a bottom edge 11c of the main substrate 10c. The second circuit board 6 is positioned on a top edge 22c of the cover substrate 20c. The top edge 22c and the bottom edge 11c are located at two opposite side of a central line C that passes through the center of the active area of the main substrate 10c.

Figure 11:
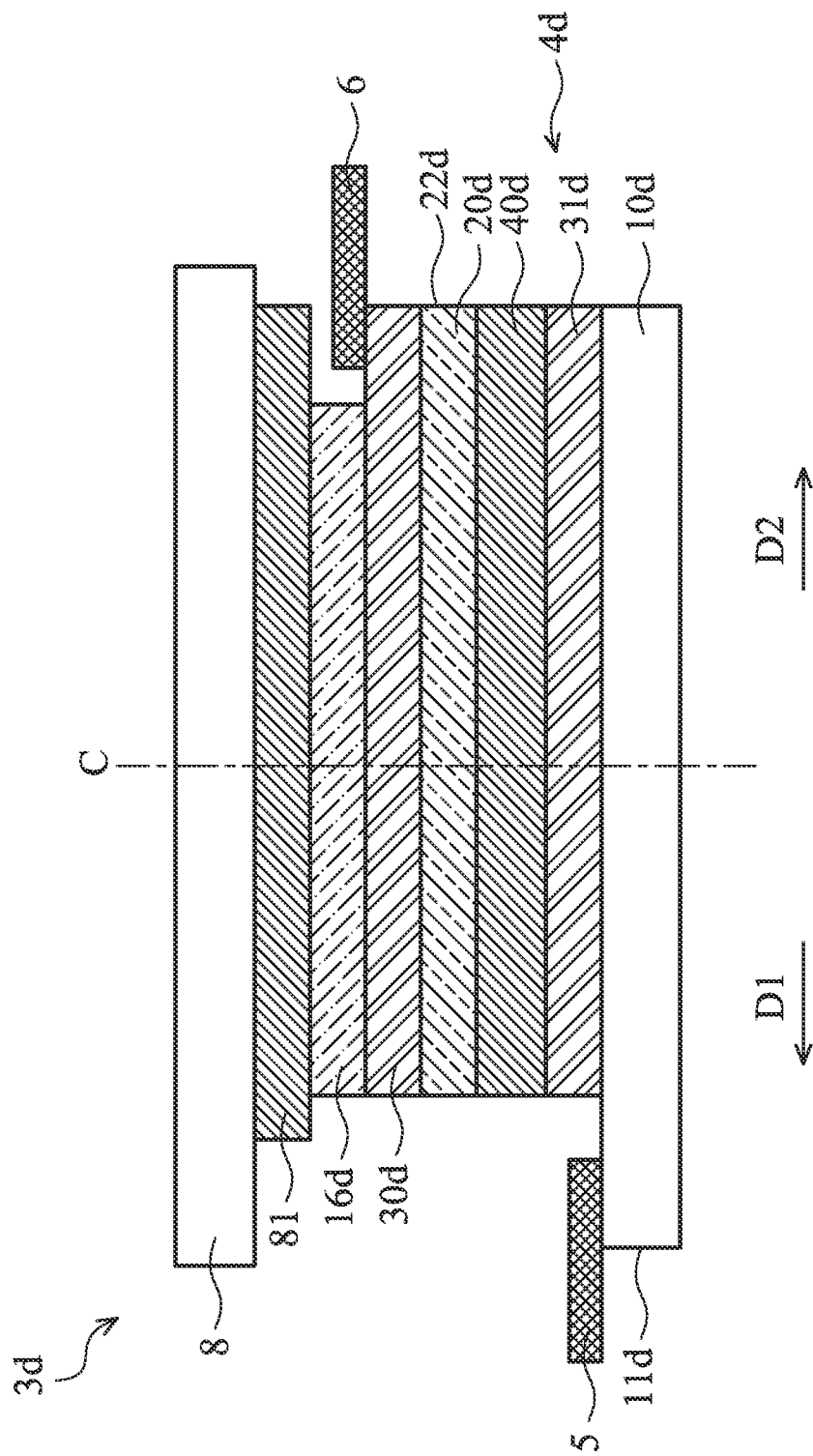
FIG. 11 shows a schematic view of an electronic display module, in accordance with some embodiments of the disclosure.

Referring to FIG. 11, an electronic display module 3d includes a display panel 4d, and a touch sensing layer 30d, the first circuit board 5, the second circuit board 6, and the protection substrate 8, in accordance with some embodiments.

In some embodiments, the display panel 4d includes a main substrate 10d, a front polarizer 16d, a cover substrate 20d, and an optical element layer 40d. The cover substrate 20d covers a portion of the main substrate 10d. The optical element layer 40d, e.g. an OLED layer, is positioned between the main substrate 10d and the cover substrate 20d. The first electrode layer 31b is positioned between the main substrate 10d and the optical element layer 40d. The second electrode layer 30d is formed integrally onto the encapsulation substrate 20d in a photo lithography process. The front polarizer 16d is disposed over the second touch sensing layer 30d. The first circuit board 5 is positioned on a bottom edge 11b of the main substrate 10d. The second circuit board 6 is positioned on a top edge 22b of the encapsulation substrate 20d. In some embodiments, the top edge is in a portion of the protection substrate 8 that extends outward in a second direction D2 opposite to the first direction D1. The top edge 22d and the bottom edge 11d are located at two opposite side of a central line C that passes through the center of the active area of the main substrate 10d.

Figure 12:
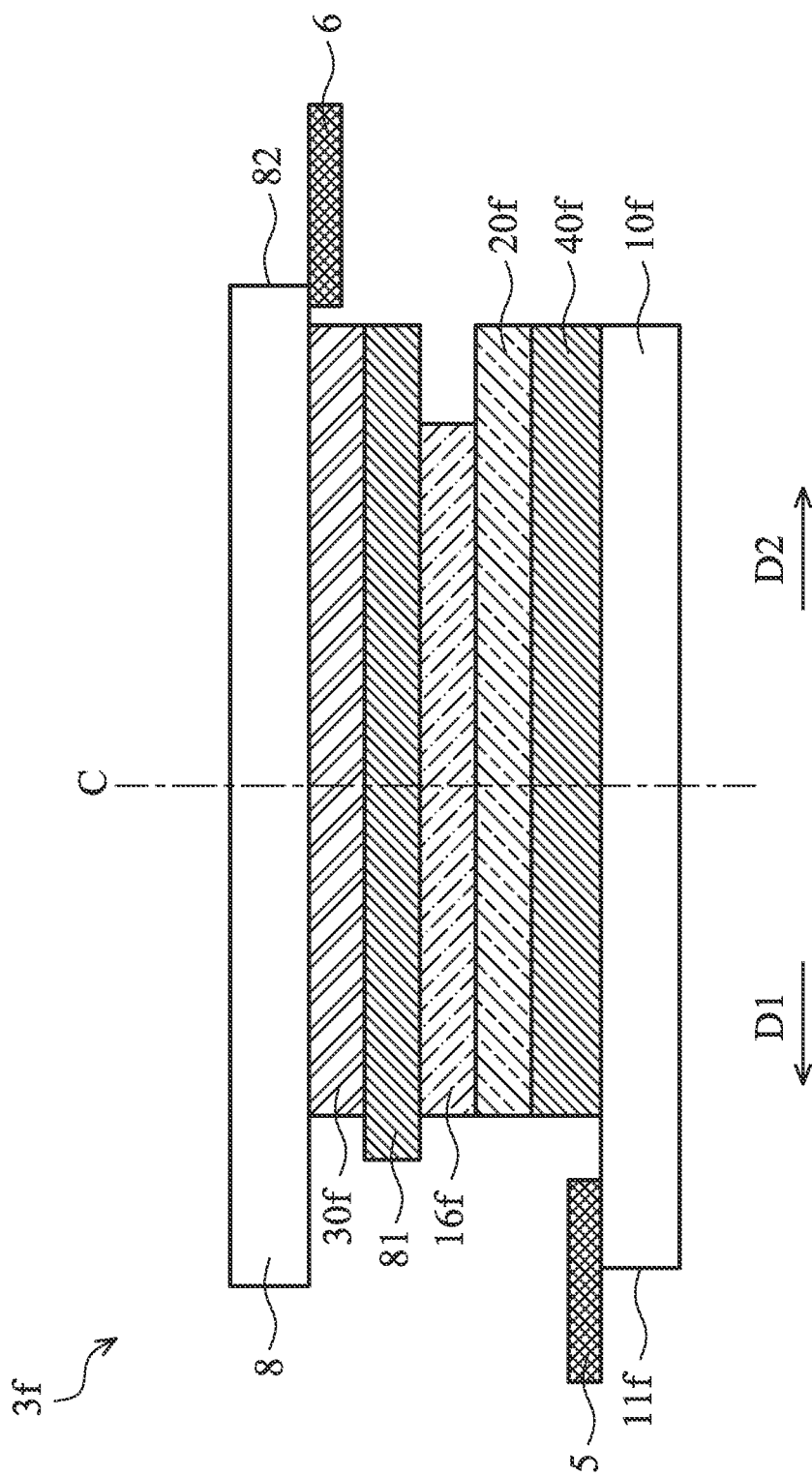
FIG. 12 shows a schematic view of an electronic display module, in accordance with some embodiments of the disclosure.

Referring to FIG. 12, an electronic display module 3f includes the main substrate 10f, a front polarizer 16f, a cover substrate 20f, the touch sensing layer 30f, the optical element layer 40f, the first circuit board 5, the second circuit board 6, and a protection substrate 8, in accordance with some embodiments.

In some embodiments, the cover substrate 20f covers a portion of the main substrate 10f. The optical element layer 40a is positioned between the main substrate 10f and the cover substrate 20f. The touch sensing layer 30f is formed integrally onto the protection substrate 8 in a photo lithography process. The front polarizer 16f is disposed over the touch sensing layer 30f. The first circuit board 5 is positioned on a bottom edge 11f of the main substrate 10f. The second circuit board 6 is positioned on a top edge 82 of the protection substrate 8. The top edge 82 and the bottom edge 11f are located at two opposite side of a central line C that passes through the center of the active area of the main substrate 10f.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic display module, comprising:
   a touch display assembly comprises:
   a main substrate having an active area and a first extending area extending outward in a first direction; and
   a cover substrate having a second extending area extending outward in a second direction;
   a first circuit board connected to the first extending area; and
   a second circuit board connected to the second extending area,
   wherein the first direction is different to the second direction,
   wherein the projection distance from edge of the active area to edge of the first extending area through the first direction is greater than the projection distance from edge of the active area to edge of the second extending area through the second direction.

2. The electronic display module as claimed in claim 1, wherein the touch display assembly comprises:
   a plurality of transistors formed on the active area of the main substrate;
   a sealing material disposed between the main substrate and the cover substrate; and
   a liquid-crystal layer disposed between the main substrate and the cover substrate and adjacent to the sealing material.

3. The electronic display module as claimed in claim 1, wherein the first extending area is exposed by the cover substrate.

4. The electronic display module as claimed in claim 1, wherein the length of the first circuit board is greater than the length of the second circuit board.

5. The electronic display module as claimed in claim 1, wherein the first direction is opposite to the second direction.

6. The electronic display module as claimed in claim 1, further comprising a protection substrate, and the cover substrate disposed between the main substrate and the protection substrate.

7. The electronic display module as claimed in claim 6, further comprising a touch sensing unit disposed between the cover substrate and the protection substrate.

8. The electronic display module as claimed in claim 1, further comprising a first driving chip disposed on the main substrate and a second driving chip disposed on the second circuit board.

9. The electronic display module as claimed in claim 1, wherein the touch display assembly comprises:
   a plurality of transistors formed on the active area of the main substrate;
   a sealing material disposed between the main substrate and the cover substrate; and
   an OLED layer disposed between the main substrate and the cover substrate and adjacent to the sealing material.

10. The electronic display module as claimed in claim 1, wherein the edge of the first extending area comprises a straight line, and the edge of the second extending area comprises a straight line.

11. The electronic display module as claimed in claim 10, wherein the straight line of the first extending area is parallel to the straight line of the second extending area.

12. The electronic display module as claimed in claim 1, wherein the active area is round shape.

13. The electronic display module as claimed in claim 1, wherein the first circuit board and the second circuit board are connected to each other at a rear of the touch display assembly.

14. The electronic display module as claimed in claim 1, further comprising a connector positioned on the first circuit board, wherein the second circuit board is connected to the first circuit board through the connector.

15. The electronic display module as claimed in claim 1, further comprising:
   a backlight assembly arranged adjacent to the touch display assembly and configured to provide backlight for the touch display assembly; and
   a third circuit board electrically connected to the backlight assembly, wherein the first circuit board overlaps the third circuit board, and the first circuit board has a through hole that partially exposes the third circuit board;
   wherein a conductive material is positioned in the through hole and electrically connects the third circuit board to the first circuit board.

16. The electronic display module as claimed in claim 1, further comprising:
   a backlight assembly arranged adjacent to the touch display assembly and configure to provide backlight for the touch display assembly; and
   a third circuit board electrically connected to the backlight assembly and comprising a first portion overlapped by the first circuit board and a second portion overlapping the first circuit board;
   wherein the third circuit board is electrically connected to the first circuit board by the second portion.

17. An electronic apparatus, comprising:
   a housing with a round shape;

a touch display assembly having a bottom and a top edge located at two sides of a substantial center of the touch display assembly;
a first circuit board is connected to the bottom edge; and
a second circuit board is connected to the top edge;
wherein the bottom edge is spaced from the substantial center of the touch display assembly by a first distance, and the top edge is spaced from the substantial center of the touch display assembly by a second distance, and the first distance is greater than the second distance but smaller than a radius of the housing.

18. The electronic apparatus as claimed in claim 17, wherein the bottom edge and the top edge are straight lines, and the straight lines are parallel to each other.

* * * * *